United States Patent [19]

Zdeblick

[11] 4,057,305

[45] Nov. 8, 1977

[54] ROTATABLE CASSETTE HOLDER

[75] Inventor: William Thomas Zdeblick, Park Ridge, Ill.

[73] Assignee: International Business Machines Corporation, Armonk, N.Y.

[21] Appl. No.: 684,994

[22] Filed: May 10, 1976

[51] Int. Cl.² .................... A47B 81/06; A47F 1/04; G11B 1/00; B65D 85/672
[52] U.S. Cl. ................................... 312/11; 206/387; 211/40
[58] Field of Search ................................ 312/8-12, 312/20, 97.1, 59; 206/387; 211/40

[56] References Cited

U.S. PATENT DOCUMENTS

| 3,072,280 | 1/1963 | Spadaro | 312/10 |
|---|---|---|---|
| 3,382,019 | 5/1968 | Maule | 312/11 |
| 3,610,424 | 10/1971 | Connan | 206/387 X |
| 3,620,363 | 11/1971 | Donnithorne | 312/97.1 |
| 3,652,142 | 3/1972 | Kreutzweiser | 312/8 |
| 3,692,376 | 9/1972 | McKinsey et al. | 312/11 |
| 3,706,395 | 12/1972 | Havener et al. | 312/97.1 |
| 3,733,112 | 5/1973 | Marquardt | 312/97.1 |
| 3,736,036 | 5/1973 | Mathus | 312/11 |
| 3,777,895 | 12/1973 | Weinstein et al. | 312/11 |
| 3,856,369 | 12/1974 | Commiant | 312/107 |

Primary Examiner—Paul R. Gilliam
Assistant Examiner—Victor N. Sakran
Attorney, Agent, or Firm—Robert W. Lahtinen

[57] ABSTRACT

A cassette storage device retains cassettes in arcuately spaced relation for rotation about a horizontal axis which provides visual access with the cassettes being received in channels that confine end portions. Retention is affected by the use of the bosses on the cassette which are retained in slotted openings in web surfaces of the channels and releasability is achieved by the resiliency of the material which forms the holder.

10 Claims, 9 Drawing Figures

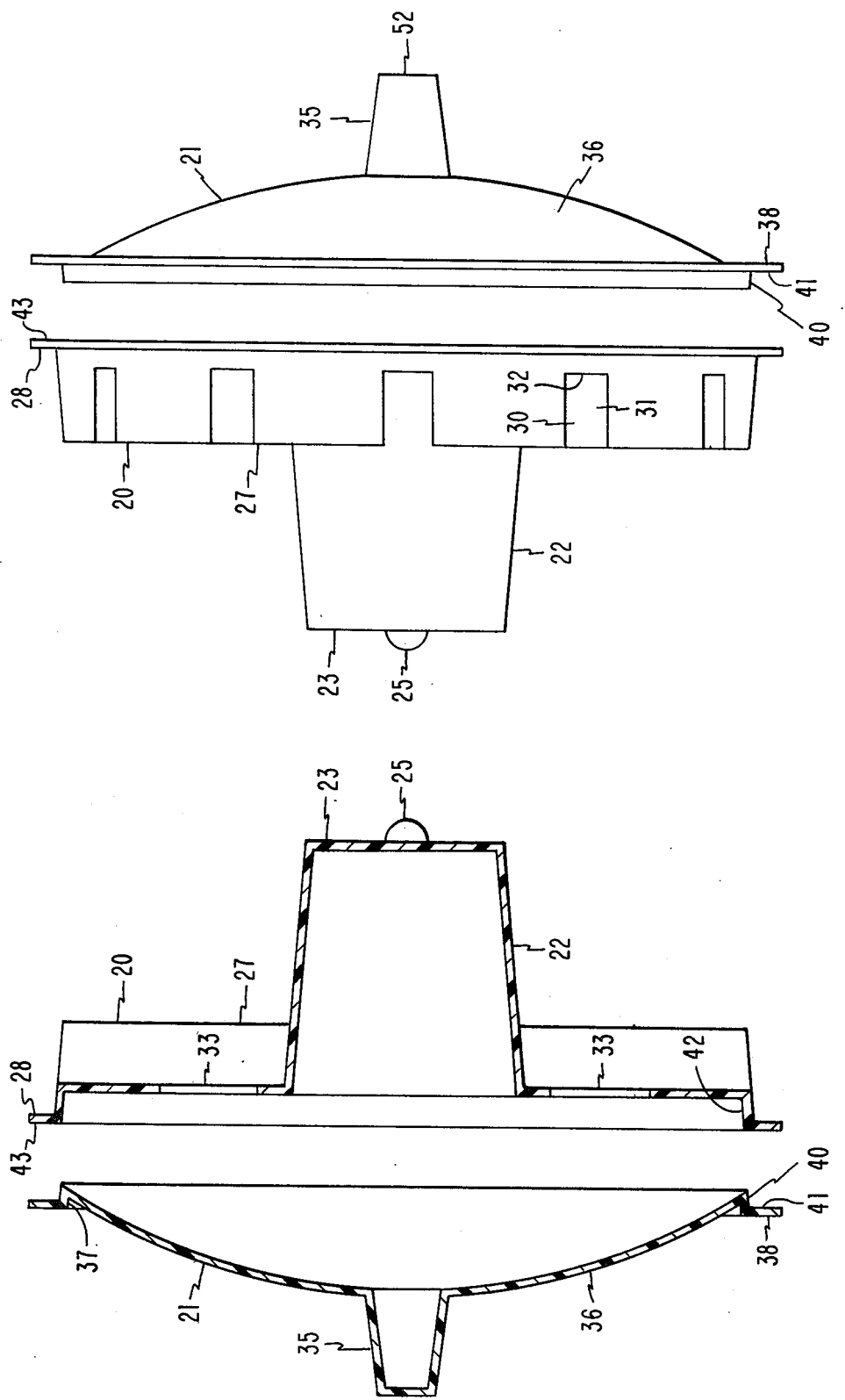

ROTATABLE CASSETTE HOLDER

BACKGROUND OF THE INVENTION

The present invention is directed to a device for housing recording tape cassettes. Tape cassettes and similar devices are commonly stored in static boxes, trays or individual containers. In those instances where a moveable storage device is provided, it is most common to use a carousel type structure which may be rotated selectively about a vertical axis.

While such storage devices may adequately retain a group of cassettes, identification of a desired cassette is rendered difficult because of the constraints placed on the position or size of the associated labels. In a carousel device a narrow end surface is exposed presenting only a limited surface where information must appear in a vertical orientation. The usual label surface is intermediate adjoining cassettes and disposed at right angles to the normal reading orientation.

SUMMARY OF THE INVENTION

In the device of the present invention the cassettes are disposed about a horizontal axis. In the normal accurately spaced positions of retention the cassette labels on the major surfaces are presented in the normal reading orientation with maximum visual access as the holder may be rotated to provide the most comfortable observation angle to the individual viewer. The cassettes are received in channels that confine the marginal end portions only to effect positive retention particularly when in the downwardly depending orientation. Such retention is effected by receipt of the projections found on the standard cassette end surfaces in recesses in the web surfaces of the cassette receiving channels. Selective radial insertion and removal of cassettes into and out of the rotary holder is effected by utilizing the inherent resiliency of the plastic material.

The structure of the device is of simplified form to permit the use of the fewest types of fabricated parts. The rotary holder assembly is formed of two basic parts wherein four parts are assembled to form a single assembly and six parts are assembled to form a tandem assembly. The central cassette holding element that has the cassette retaining channels formed therein includes two identical parts each with a frustoconical projecting portion. The parts are bonded together along the confronting reduced diameter end surfaces of these frustoconical projections. These end surfaces each have a cooperating projection and depression that coordinate with the like structure of an identical part to make the part self-aligning when assembled. This self-aligning feature provides for both axial alignment and rotational alignment whereby the cooperating cassette receiving channels are correctly positioned. The other part is an end cap that carries an axially projecting trunion. Cooperating flanges in the central portion assembly and the end cap cooperate to produce alignment during assembly. If a tandem unit is desired two of the central portion assemblies may be bonded together along the axially confronting peripheral flange surfaces. The hub formed by the bonded frustoconical projections has the minor diameter at the axial midpoint. The larger diameter at the radially inward ends of the channels forms a stop for inserted cassettes and the reduced diameter therebetween assures that the cassette opening at which the tape is exposed is precluded from contact with the holder assembly and is remotely positioned making it unnecessary to contact this portion of the cassette during either insertion or removal.

BRIEF DESCRIPTION OF THE DRAWINGS

FIGS. 4 and 5 show exploded elevation views of the wheel element and bearing plate portion of the cassette holder unit with FIG. 4 being a vertical section through the axis and FIG. 5 being in full view.

DETAILED DESCRIPTION

Figure 1:
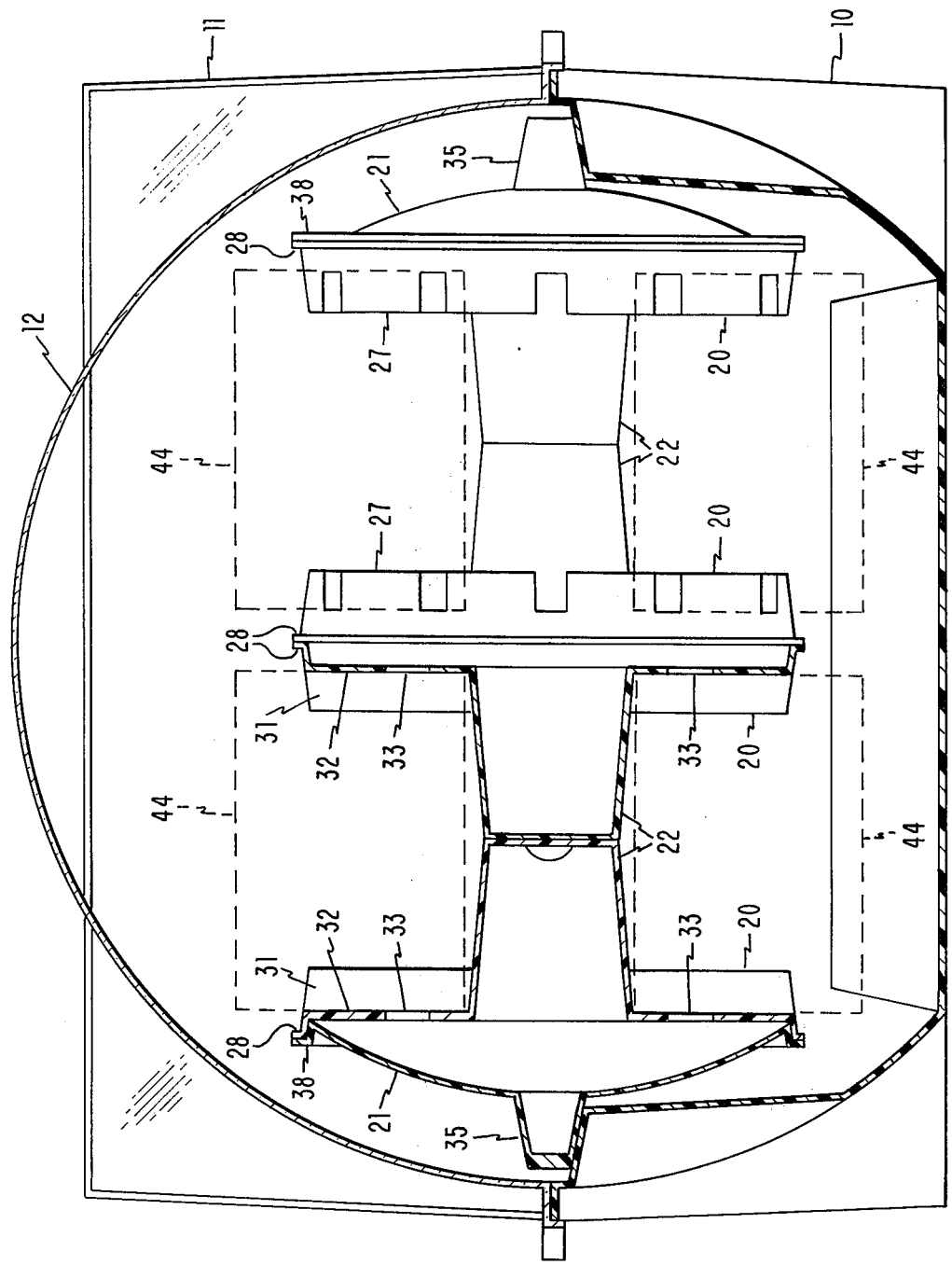
FIG. 1 is a partial front elevation view in the form of a section along line 1—1 of FIG. 2 with a tandem cassette holder unit shown partially in section and partially in full view within the associated enclosure and selected cassette storage locations identified in phantom view.
Figure 2:
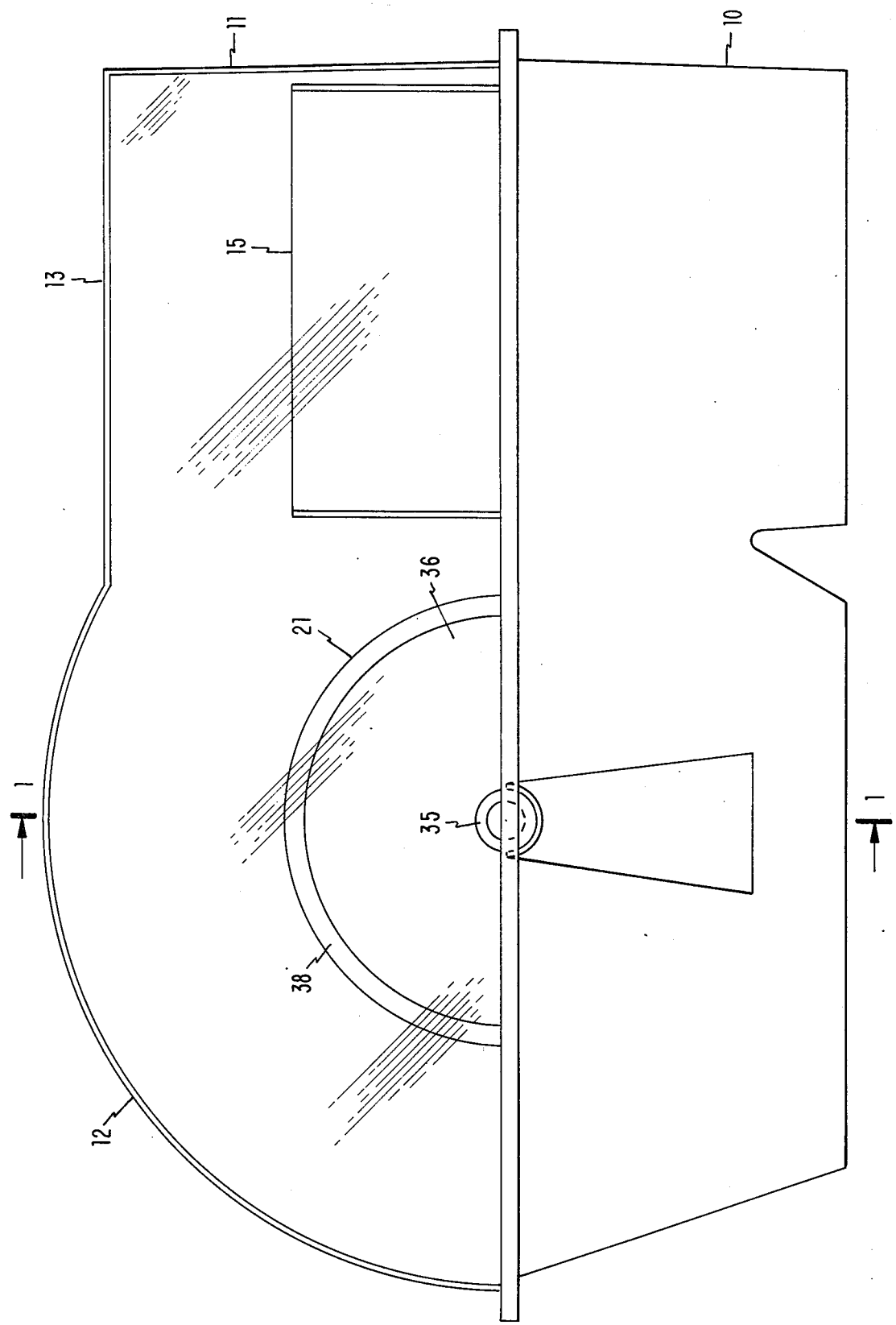
FIG. 2 is a side elevation of the enclosure and cassette holder of FIG. 1.

The cassette holder of the invention as shown in FIGS. 1 and 2 is a tandem unit mounted within a base 10 with a transparent cover 11. The enclosure as shown provides a housing for both the tape cassettes and for associated materials that may be coordinated therewith to afford a convenient common storage. The rotary cassette holder enclosure 12 forming the forward part of the enclosure assembly is substantially spherical while the rearward portion 13 for storing related materials such as books, pamphlets and the like is largely rectangular with a four-sided insert 15 for providing lateral confinement of materials extending above the base member 10.

Figure 3:
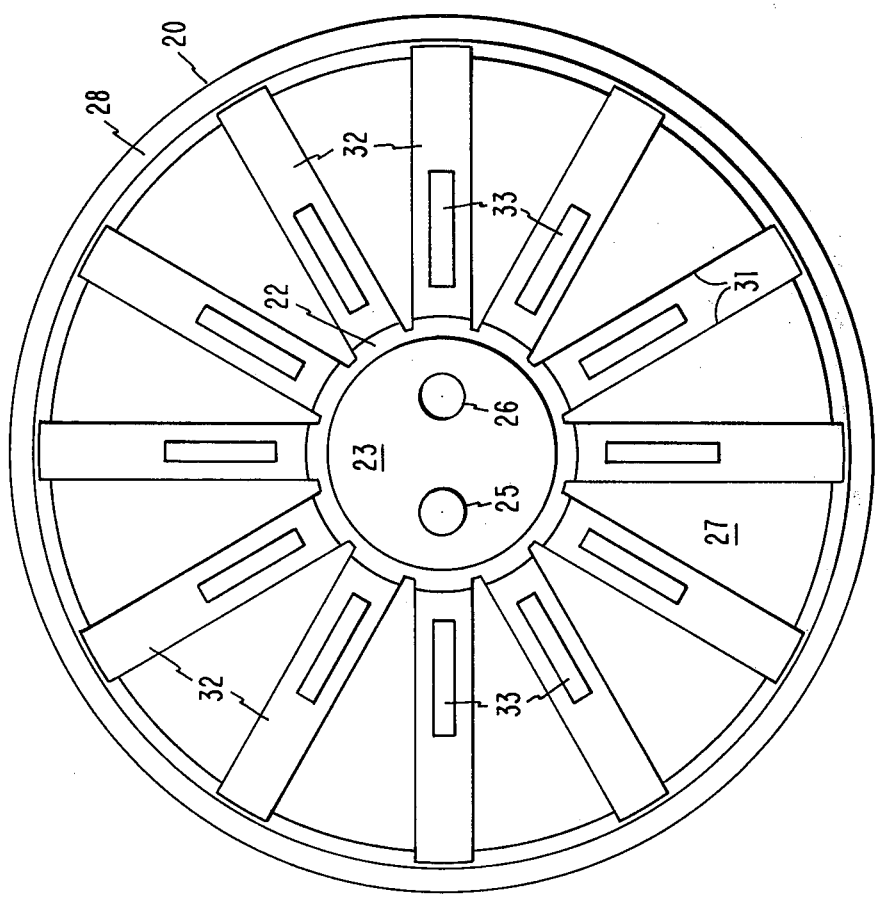
FIG. 3 is an axial end view of a cassette holder wheel element.

The rotary cassette holder unit is an assembly of four wheel elements 20 and a pair of end caps or bearing plates 21. Referring to FIGS. 3, 4 and 5, the wheel element 20 and bearing plate 21 are each single piece plastic parts that may be either fabricated by vacuum forming or injection molding. The wheel element 20 has a frustoconical hub 22 with an end surface 23. The end surface 23 has a hemispherical projection 25 and a hemispherical recess 26 of the same dimension. The disk portion 27 between the hub 22 and the peripheral flange 28 has a series of channels 30 formed therein. Each channel has a pair of flange surfaces 31 and a web surface 32 extending radially outward from hub 22. The web surface 32 has an open slot or cassette retaining means 33 formed therein.

Bearing plate 21 has a frustoconical trunion 35 axially extending therefrom. From the trunion 35 a cupped disk portion 36 extends to a cylindrical portion 37 and peripheral flange 38. Cylindrical surface 40 and flange axial surface 41 cooperate with the wheel element interior cylindrical surface 42 and axially facing peripheral flange surface 43 for purposes of assembly.

In the assembled condition, two wheel elements 20 are secured to one another by bonding the end surfaces 23 of the frustoconical portions 22 to one another. In the assembled condition the hemispherical projection 25 extending from each surface 23 is received in the hemispherical recess 26 of the cooperating opposed surface 23. This cooperation of projections and recesses provides the correct axial alignment of the wheel elements 20 and also rotationally aligns cooperating pairs of channels 30 so that each pair defines a radially extending space for receiving a tape cassette.

A single rotatable holder assembly can be formed by assembling a bearing plate 21 to each axial end of a pair of wheel elements 20 that have been bonded to one another along the interface of end surfaces 23 or as shown in FIG. 1, a tandem unit can be formed by axially joining assembled pairs of wheel elements along the axially adjoining peripheral flange surfaces 43 and completing the assembly with a pair of bearing plates 21 assembled to each axial end.

In the assembled condition shown in FIG. 1, the dash line rectangles 44 upwardly extending and downwardly depending vertically in generally radially projecting spoke-like fashion show cassette storage locations defined by the cooperating disk channels 30 and central hub portions 22 of the rotatable cassette holder unit. The cassette end portions are closely confined by the channel web surfaces 32 and flange surfaces 31. If a cassette is properly inserted radially so that the ends of the cassette engage the radially enlarged ends of the frustoconical hub portions or stop means 22 with the exposed tape facing radially inwardly, the elongated bosses projecting from each end surface of the standard cassette are received in the channel web slot 33 to positively retain the cassette. The inherent resiliency of the injection molded or vacuum formed channel wall surfaces accommodates cassette insertion and withdrawal. Also the reduced diameter of the wheel element hub portions 22 adjoining the surfaces 23 assures that the access opening of the cassette is not only protected by being radially inward but is precluded from contact with the structure of the holder assembly.

Figure 6:
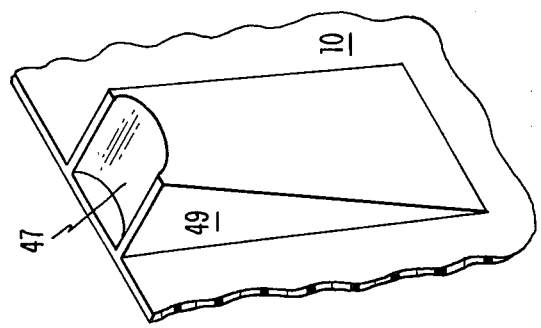
FIG. 6 is a detail view of the interior wall surface of the base member showing the structure for supporting the cassette holder assembly trunions within the base.

The trunions 35 of the holder assembly rest on a pair of cooperating frustoconical surface segments 47 formed as projections from the inner wall surfaces of the base 10. FIG. 6 shows a detail of the structure as formed when an injection molded base is utilized. The trunion support includes the curved wall that forms the supporting surface 47 and a pair of reinforcing ribs 49 all of which are formed as an integral portion of the base 10.

The provision of the trunion supporting wall surface 47 could also be accomplished by bonding an insert including a curved wall surface and a pair of depending ribs to the interior surface of base member 10. By using this alternative design, a continuously, substantially spherical exterior surface could be provided without the use of complex and expensive inside pull molds for forming the base 10.

Figure 8:
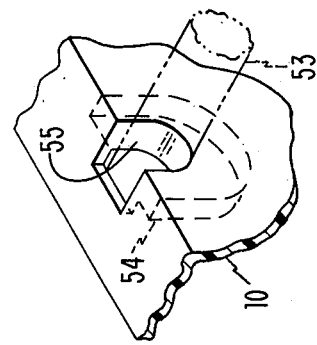
FIG. 8 shows the detail of the base wall portion which supports the holder assembly in the embodiment of FIG. 7.
Figure 7:
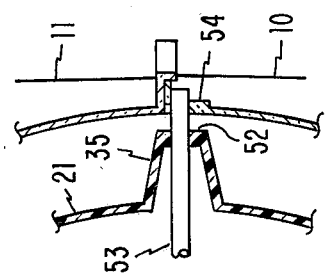
FIG. 7 is a vertical axial section of the pivotal mounting of the holder assembly in the modified form wherein a rod member is utilized to enhance holder rigidity.

If it is desired to provide greater rigidity to the rotatable holder assembly, a shaft may be used as part of the assembly with the holder elements assembled axially about such shaft. This modification is illustrated in the detail drawings of FIGS. 7 and 8. When this embodiment is used the wall 23 of wheel element 20 and end wall 52 of bearing plate 21 are provided with axial apertures that permit each of these parts to be assembled snugly about the shaft 53. In addition, the wall of base 10 is modified to provide an increased thickness portion 54 formed as a part of base 10 in which a trunion supporting surface 55 is presented. In this embodiment the portion of rod 53 projecting beyond bearing plate wall 52 serves as the holder assembly trunion that is rotatably supported on base surface 55.

Figure 9:
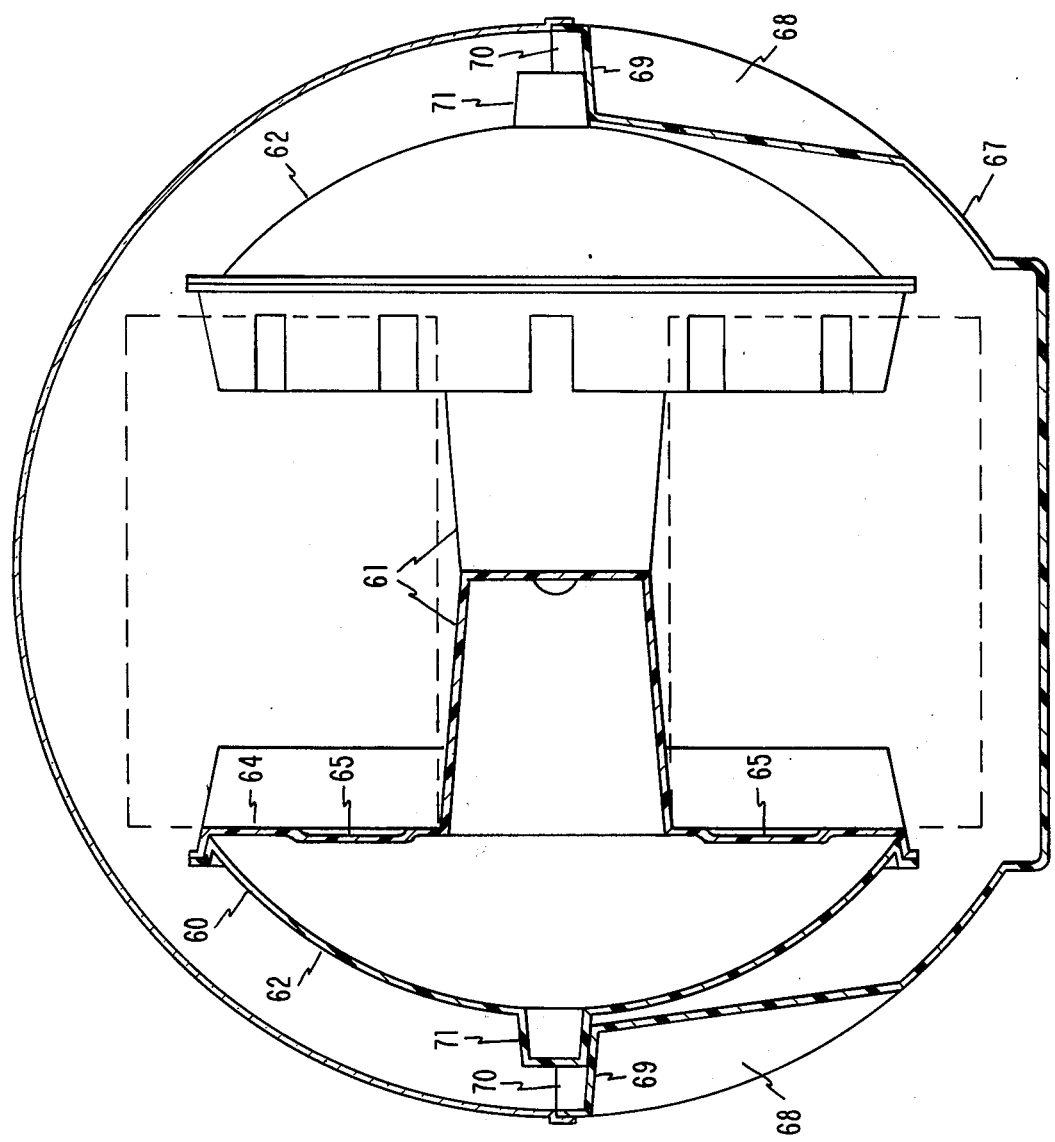
FIG. 9 shows a further embodiment, partially in axial section, using a single rotatable holder supported in an enclosure wherein the parts are fabricated using vacuum form techniques.

FIG. 9 illustrates a further embodiment of the invention wherein a single holder assembly 60 and the cooperating enclosure are fabricated of vacuum formed parts. The holder assembly 60 includes a pair of wheel elements 61 and a pair of bearing plates 62. The wheel element cassette retaining slots in the channel web surfaces 64 are formed as slotted depressions 65. The base 67 includes depressions 68 which provide walls 69 that present the surfaces 70 adapted to receive and support the holder assembly trunions 71.

While the invention has been particularly shown and described with reference to preferred embodiments thereof, it will be understood by those skilled in the art that the foregoing and other changes in form and details may be made therein without departing from the spirit and scope of the invention.

What I claim as my invention is:
1. A recording tape cassette container comprising
    a base member presenting horizontally spaced trunion supporting surfaces formed about a horizontal axis;
    a cassette retaining holder including horizontally spaced trunion projections mounted on said base member supporting surfaces for rotation about a horizontal axis;
    spaced opposed channels including web and flange surfaces formed in said holder for receiving tape cassettes in angularly spaced, spoke-like relation about said horizontal axis; and
    retaining means in said opposed channel web surfaces for releaseably securing said cassettes respectively in said spaced, opposed channels.
2. The recording tape cassette container of claim 1 wherein said holder comprises
    a pair of identical parts each formed of resilient material with a generally radially extending surface portion and a frustoconical axially extending portion with an end surface at the reduced diameter end thereof
    said generally radially extending surface portion having channels formed therein
    said pair of identical parts being secured together with said end surfaces bonded to one another with said channels of one of said parts respectively aligned with the channels of the other of said parts.
3. The recording tape cassette container of claim 2 wherein said pair of identical parts further include alignment means comprising a projection and recess in each of said end surfaces that cooperate to effect said alignment of said channels.
4. The recording tape cassette container of claim 3 further comprising
    formed end enclosure members which are secured to the axial ends of the assembly said identical parts to form said cassette holder,
    said end enclosure members including the axially extending horizontally spaced trunion projections formed as an integral portion thereof.
5. The recording tape cassette container of claim 4 wherein said cassette retaining holder comprises an assembly including two pairs of said identical parts secured to one another in pairs with said pairs axially aligned and bonded together along confronting surfaces of said generally radially extending surface portions and said end enclosure members are secured to said two pairs of identical parts at each axial end of said assembly.

6. The recording tape cassette container of claim 1 wherein said retaining means comprises a slotted recess centrally disposed in the web portion of each of said channels and said channel web and flange wall portions are formed of resilient material, whereby a substantially rigid cassette may be inserted or withdrawn and retained by cooperation of bosses thereon and said slotted recesses.

7. The recording tape cassette container of claim 6 wherein said aligned channels extend radially from the axis of said holder and said frustoconical surface portion adjoining web surfaces of said channel wall portions provides stop means for limiting radially inward travel of a cassette inserted into the space defined by said spaced opposed channels.

8. A recording tape cassette container comprising
a base member;
a cassette holder assembly; and
means for mounting said cassette holder assembly on said base member for rotation about a horizontal axis;
said cassette holder assembly including a cassette holder formed of resilient material and presenting opposed, aligned channel pairs for receiving a cassette in each of said channel pairs in generally spoke-like fashion about said horizontal axis, and
recess means in the web surface portion of each of said aligned channels to receive a boss projecting from the end surface of a cassette received in such channel whereby the cassette is releaseably retained by said cassette holder.

9. A recording tape cassette container as in claim 8 wherein said cassette holder assembly comprises
a pair of like parts each having a generally radially extending wall portion having arcuately spaced channels formed therein and a central axially extending portion,
means joining the ends of said central axially extending portions with the channels of one of said pair respectively aligned with the channels of the other of said pair to define a series of arcuately spaced cassette receiving and retaining spaces.

10. The recording tape cassette container of claim 9 further comprising a transparent cover member which cooperates with said base member to enclose said holder assembly while permitting visual observation of arcuately spaced cassettes retained by said holder assembly.

* * * * *